(12) United States Patent
Ali

(10) Patent No.: US 6,539,229 B1
(45) Date of Patent: Mar. 25, 2003

(54) SYSTEM AND METHOD FOR MOBILE LOCATION DETECTION IN SYNCHRONOUS WIRELESS SYSTEMS

(75) Inventor: Farhan Ali, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/372,153

(22) Filed: Aug. 20, 1999

Related U.S. Application Data
(60) Provisional application No. 60/097,248, filed on Aug. 20, 1998.

(51) Int. Cl.[7] .............................. H04Q 7/20; G01S 3/02
(52) U.S. Cl. ..................... 455/456; 342/450; 342/463; 342/464; 455/404
(58) Field of Search ......................... 455/456; 342/450, 342/463, 464, 457, 387; 340/988

(56) References Cited

U.S. PATENT DOCUMENTS

| | | | | |
|---|---|---|---|---|
| 4,494,119 A | * | 1/1985 | Wimbush | 342/457 |
| 5,815,538 A | * | 9/1998 | Grell et al. | 455/456 |
| 5,903,844 A | * | 5/1999 | Bruckert et al. | 455/456 |
| 5,943,014 A | * | 8/1999 | Gilhousen | 342/456 |
| 6,212,391 B1 | * | 4/2001 | Saleh et al. | 455/456 |
| 6,230,018 B1 | * | 5/2001 | Watters et al. | 455/456 |

FOREIGN PATENT DOCUMENTS

| EP | 0 767 594 A2 | * | 4/1997 | ............ 343/456 |
|---|---|---|---|---|

* cited by examiner

*Primary Examiner*—Nay Maung
*Assistant Examiner*—Ray Persino
(74) *Attorney, Agent, or Firm*—Blakely, Sokoloff, Taylor & Zafman LLP

(57) ABSTRACT

A system and method for determining the geographic location of a mobile station in a mobile telephone system is disclosed. The system broadcasts a series of forward link triangulation signals from an array of base transceiver stations, so that a mobile station may determine the differential times of arrival, and thereby the mobile station's location.

23 Claims, 6 Drawing Sheets

SYSTEM AND METHOD FOR MOBILE LOCATION DETECTION IN SYNCHRONOUS WIRELESS SYSTEMS

CROSS-REFERENCE TO RELATED APPLICATIONS

This application claims the benefit of the filing date of U.S. provisional patent application, entitled "Mobile Location Detection Method in Synchronous Wireless Systems", Ser. No. 60/097,248, filed Aug. 20, 1998.

BACKGROUND OF THE INVENTION

(1) Field of the Invention

The present invention relates to the field of mobile telephony. In particular, the present invention relates to an apparatus and a method for determining the geographic location of a mobile transceiver.

(2) Description of Related Art

Emergency calls placed from someone involved in or observing an emergency situation are easily placed and routed to the appropriate emergency response authorities by dialing the number 911. This system is therefore called the 911 call response system. Because the person placing the call may be under stress, duress, or be otherwise incapacitated, a newer version of the 911 call response system, called Enhanced 911 (E911), is entering service. In the E911 system the location of the caller is sent to the emergency response authorities, enabling a response even when the caller can do little more than dial the number 911. For calls placed from a fixed location, the telephone companies' billing databases may be searched to give a location associated with each originating telephone number.

The E911 system is more difficult to implement for mobile (cellular) telephones. Cellular telephones by their nature may vary in location. However, at the present time about half of all E911 calls are placed from a cellular phone. For this reason the Federal Communications Commission (FCC) has mandated that a high percentage of cellular E911 calls be able to report the caller's location within 125 meters.

One method of locating the mobile telephone's location consists of placing additional equipment into the mobile telephone so that it may independently determine its geographic location. For example, a Global Positioning System (GPS) receiver could be incorporated into the mobile telephone. This method has several drawbacks. The addition of the GPS receiver adds cost and bulk to the mobile receiver. Additionally, the GPS receiver requires clear radio-frequency (RF) access to multiple GPS satellites in order to calculate a position. There are many circumstances where a mobile phone could place a call yet not have RF access to multiple GPS satellites.

Another method of locating the mobile telephone's location derives the location using only the mobile telephone system's equipment. One method proposed to allow the temporary location of a cellular telephone to be determined and routed to the emergency response authorities is called reverse link triangulation. Cellular phone connections consist of forward links sent from fixed base stations to a mobile station, and reverse links sent from a mobile station to a fixed base station. In reverse link triangulation, a mobile station broadcasts a special signal that may be received by multiple base stations. If the base stations each have a synchronized local time standard, the differential time of arrival (DTOA) of the special signal at the various base stations may be determined by reading each local time standard when the special signal arrives at each base station. From the DTOA data and the speed of light may be calculated the distance from the mobile station to each base station. If three or more base stations receive the special signal, and the location of these base stations is known, then a computational element in the cellular phone system may determine the location of the mobile station.

Reverse link triangulation advantageously utilizes the existing mobile telephone system. However, it has limitations. The mobile telephone is limited in transmission power. For this reason it is not always possible for the special signal of reverse link triangulation to be received by three or more base stations.

Therefore a method for reliably determining the geographic location of a mobile telephone is at issue in mobile telephone systems.

SUMMARY

A system and method for determining the geographic location of a mobile station in a mobile telephone system is disclosed. The method begins with broadcasting a series of forward link triangulation signals from a series of base transceiver stations. The mobile station then receives and timestamps the forward link triangulation signals. By calculating a first hyperbola and a second hyperbola from these timestamped forward link triangulation signals, the intersection of the first hyperbola and second hyperbola will yield the desired geographic location of the mobile station.

BRIEF DESCRIPTION OF THE DRAWINGS

The features, aspects, and advantages of the present invention will become more fully apparent from the following detailed description, appended claims, and accompanying drawings in which:

DETAILED DESCRIPTION

In the following description, numerous specific details are set forth to provide a thorough understanding of the present invention. However, one having an ordinary skill in the art may be able to practice the invention without these specific details. In some instances, well-known circuits, structures, and techniques have not been shown in detail to not unnecessarily obscure the present invention.

Figure 1:
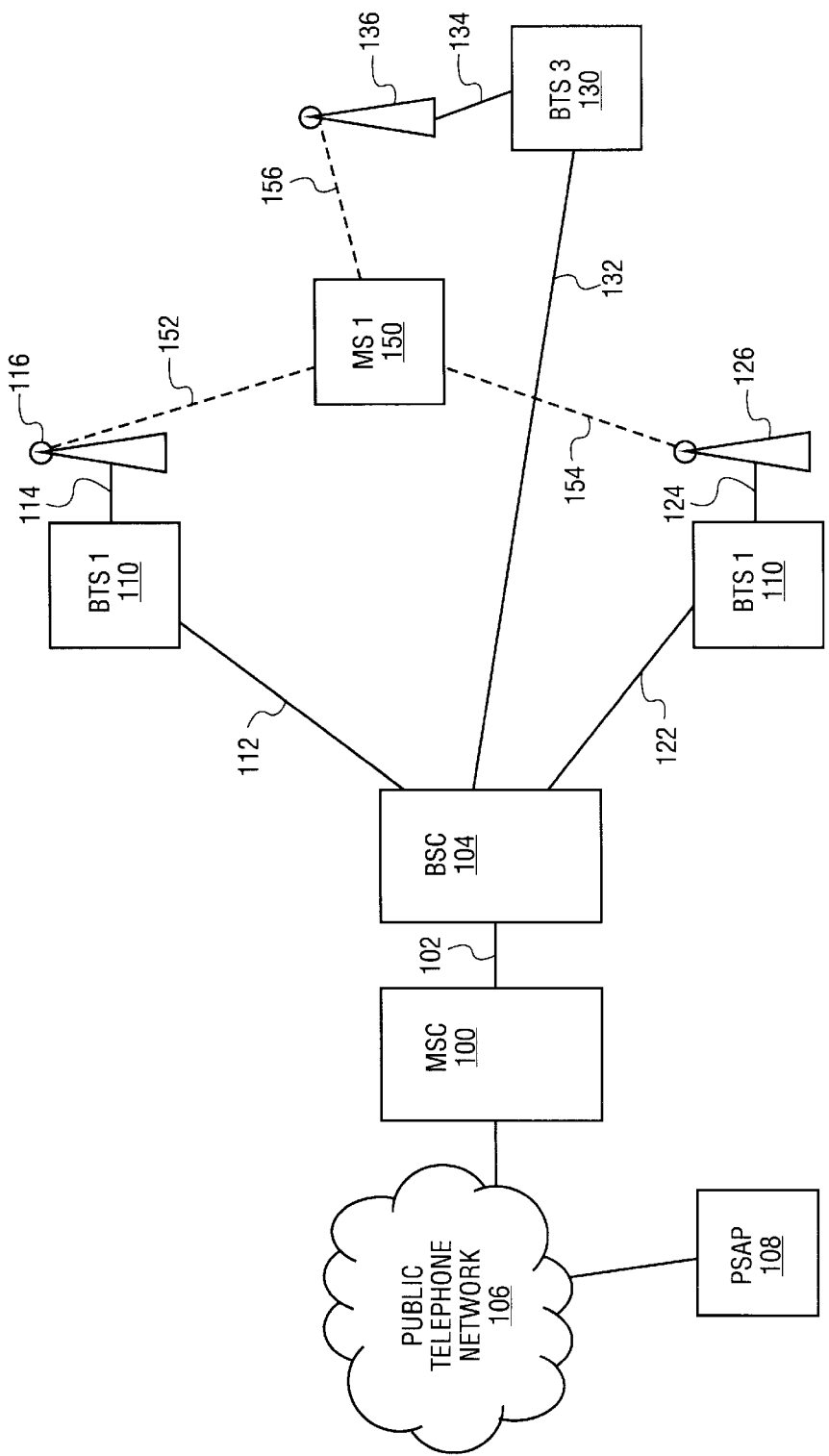
FIG. 1 is a block diagram of a mobile (cellular) telephone system, according to one embodiment of the present invention.

Referring now to FIG. 1, a block diagram of a mobile (cellular) telephone system is illustrated, according to one embodiment of the present invention. In different embodiments several different kinds of synchronous wireless mobile telephone systems are envisioned. For the purpose of illustration, the Code Division Multiple Access (CDMA) mobile telephone system is shown. A common form of CDMA system is one designed in accordance with Telecommunications Industry Association (TIA) specification TIA/IS-95A (May 1995), which herein is incorporated by reference.

In the FIG. 1 embodiment, major components of the CDMA mobile telephone system are the mobile switching center (MSC) 100, the base station controller (BSC) 104, several base transceiver stations (BTS) 110, 120, 130, with associated antennas 116, 126, 136, and at least one mobile station (MS) 150.

The MSC 100 comprises the gateway between a regional mobile telephone system and the overall public telephone network 106. The E911 calls originating within the regional mobile telephone system are routed to the public safety access point (PSAP) 108 through the public telephone network 106 by MSC 100. Associated with the MSC 100 may be several databases used in controlling the mobile telephone system, such as a home location register and a visitor location register.

The BSC 104 includes a control computer for controlling the interaction of the BTSs. The BSC 104 may control the transmit power levels in the BTSs, and may also cause the transmission of messages which will control the transmit power levels of an MS 150. One of the prime functions of the BSC 104 is to multiplex and de-multiplex the various control signals and voice/data channels in the mobile telephone system.

Each BTS 110, 120, 130 contains several transmitters and receivers, one for each frequency band. Each BTS 110, 120, 130 is connected via a land-line 112, 122, 132, respectively, to the BSC 104. Each BTS 110, 120, 130 is attached to an antenna 116, 126, 136, respectively, via cabling. Typically each BTS 110, 120, 130 is located a very short distance away from corresponding antenna 116, 126, 136.

Because the CDMA mobile telephone system utilizes packets of data and pseudo-random (PN) codes, each transmission of the several BTSs must be synchronized to a common time standard. In the present embodiment the Global Positioning System (GPS) is used to distribute a synchronized time standard. Therefore each BTS 110, 120, 130 contain GPS receiver circuits sufficient to maintain a common time standard.

Figure 2:
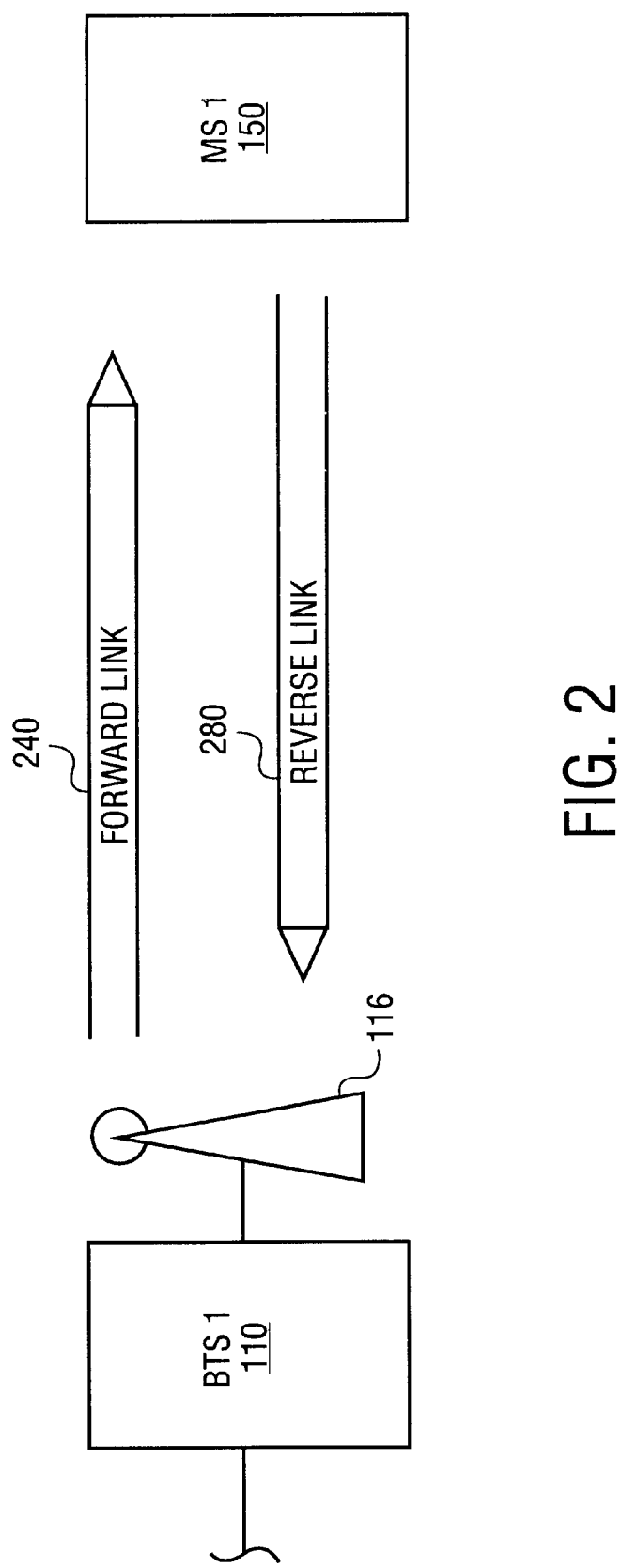
FIG. 2 is a block diagram of forward and reverse links, according to the FIG. 1 embodiment.

Referring now to FIG. 2, a block diagram of forward and reverse links is illustrated, according to the FIG. 1 embodiment. An ongoing call in the CDMA mobile telephone system includes a wide bandwidth radio-frequency (RF) communications channel transmitted by the BTS 1 110 through antenna 116 and received by MS 1 150, called a forward link 240. The ongoing call also includes a wide bandwidth RF communications channel transmitted by the MS 1 150 through its attached antenna (not shown) and received by BTS 1 110, called a reverse link 280. Both the forward link 240 and the reverse link 280 may carry multiple calls which may be separated by a series of unique code sequences, each associated with one of the mobile stations.

MS 1 150 begins an initialization process in order to access the CDMA mobile telephone system. MS 1 150 first determines a suitable carrier channel by scanning for the signal strength of incoming radio carrier channels. The MS 1 150 then determines the strongest radio carrier channel that contains a control channel. Once this control channel is found, MS 1 150 receives control information including, among other things, the data required for MS 1 150 to access the channel and the maximum transmit power MS 1 150 should use when initiating a call. In the FIG. 2 embodiment, BTS 1 110 will transmit a control channel on forward link 140.

Once the control information has been received, MS 1 150 transmits an identifying message on reverse link 280 to identify MS 1 150 to the CDMA mobile telephone system.

Figure 3:
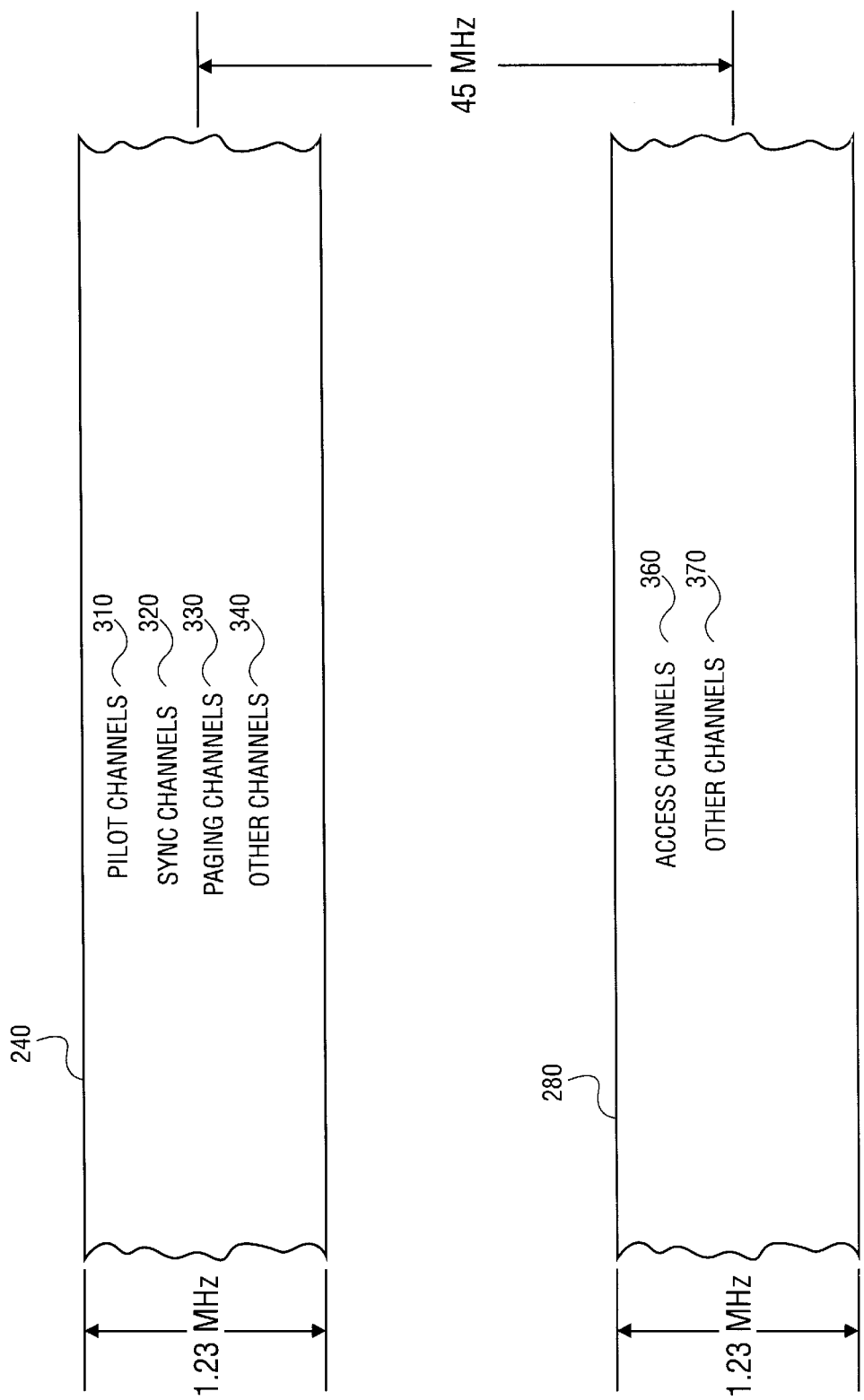
FIG. 3 illustrates the channel allocation in the links of FIG. 2, according to one embodiment of the present invention.

Referring now to FIG. 3, the channel allocation in the links of FIG. 2 is shown, according to one embodiment of the present invention. Many separate channels are carried simultaneously within a forward link 240 and a reverse link 280. In one embodiment, forward link 240 and reverse link 280 each have 1.23 MHz bandwidth, and the center frequency of each link are separated by 45 MHz. The channels are embedded within the forward link 240 and the reverse link 280 by the CDMA modulator/demodulators. The forward link 240 uses quadrature phase shift keying (QPSK) and the reverse link 280 uses offset quadrature phase shift keying (O-QPSK). Each channel is identified by a unique code.

Within forward link 240, pilot channels 310 contain beacon, timing and phase reference, and signal strength for power control for the MS 1 150. The pilot channels 310 usually are the strongest RF powered signals sent from BTS 1 110. The pilot channels contain a PN code that is time shifted for identifying which BTS is transmitting.

Sync channels 320 provide MS 1 150 with time synchronization information.

Paging channels 340 are used to communicate with MS 1 150 when no call is in progress. The paging channels 340 may contain system and access parameters necessary for the MS 1 150 to initiate calls. Paging channels 340 may additionally contain signals indicating an incoming call is pending so that MS 1 150 may initiate the reception of an incoming call.

Other channels 340 within forward link 240 may include forward traffic channels. The forward traffic channels are the primary channels used after a call is initiated to carry voice and data from BTS 1 110 to MS 1 150.

Within reverse link 280, access channels 360 carry responses generated by MS 1 150 to commands and call origination requests sent by BTS 1 110. The access channels 360 may additionally carry other signals generated by MS 1 150 when no reverse traffic channel is established.

Other channels 370 within reverse link 280 may include reverse traffic channels. The reverse traffic channels are the primary channels used after a call is initiated to carry voice and data from MS 1 150 to BTS 1 110.

In one embodiment of the present invention, a special signal is used within forward link 240 for the purpose of determining the geographical location of MS 1 150. This signal, called the forward link triangulation signal (FLTS), is transmitted by each BTS at the exact same time, using the common time standard maintained in each BTS and synchronized by GPS. The FLTS may be carried by the pilot channels 310 or it may be carried by the sync channels 320. In other embodiments the FLTS may be carried by other circuits 340 of the forward link 240.

The FLTS may be sent periodically or continuously. In either case, MS 1 150 may receive FLTS messages from BTS 1 110, BTS 2 120, and BTS 3 130. Each FLTS message may arrive at MS 1 150 at a slightly different time, depending upon the signal propagation delay occurring due to the differing signal paths 152, 154, 156 between MS 1 150 and antennas 116, 126, and 136, respectively. By time stamping the arrival times, MS 1 150 may determine the time difference of arrival (TDOA) between the FLTS signals sent by BTS 1 110, BTS 2 120, and BTS 3 130. For convenience, it may be convenient to denote the TDOA between the FLTS sent by a BTS A and the FLTS sent by a BTS B as TDOA (A, B). Using this notation, MS 1 150 may then determine TDOA (1, 2) and TDOA (2,3).

Figure 4:
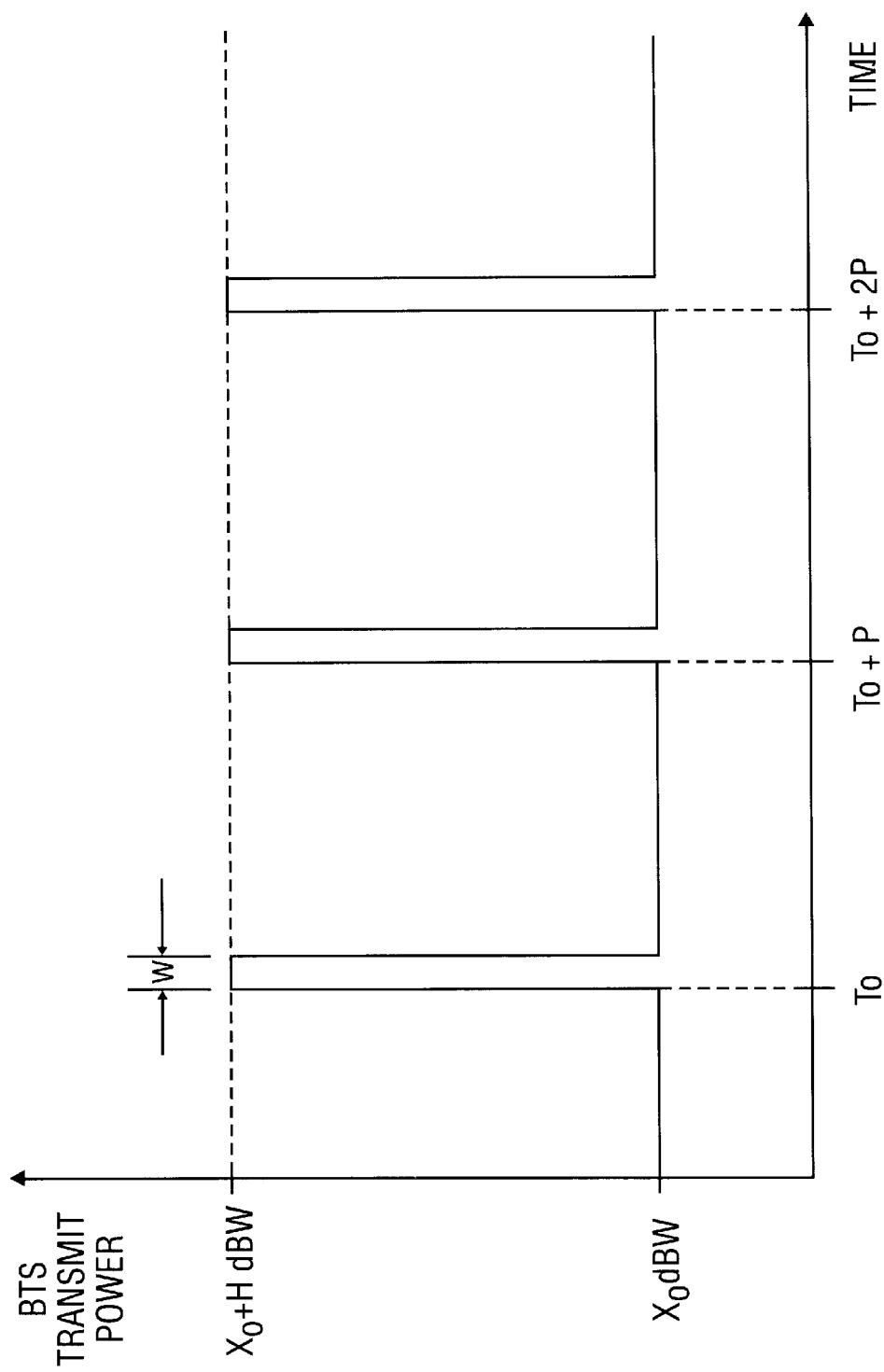
FIG. 4 illustrates a transmit power timing diagram for the forward link of FIG. 2, according to one embodiment of the present invention.

Referring now to FIG. 4, a transmit power timing diagram for the forward link of FIG. 2 is shown, according to one embodiment of the present invention. In the discussion of FIG. 3 above, it was noted that the FLTS signals may be transmitted in a synchronized but periodic manner. The average transmission power of a BTS is limited by Federal Communications Commission (FCC) rules due to concerns about health and other impacts of radiated RF energy. It is therefore not possible to maintain a high RF power transmission of CDMA forward links 240. Indeed a CDMA mobile telephone system constantly adjusts the transmitted power of both the BTSs and the MSs in order to minimize the average RF power transmission within the system.

In one embodiment of the present invention, for FLTS signals which are periodically transmitted with repetition period P, BTS 1 110, BTS 2 120, and BTS 3 130 may temporarily increase the baseline transmitted power $X_0$ dBW by an amount H dBW during the transmission time required for an FLTS. The value of H will depend upon the transmitters within BTS 1 110, BTS 2 120, and BTS 3 130, and the size of the cells within the CDMA mobile telephone system. The resulting increased transmitted power $X_0+H$ dBW increases the likelihood that MS 1 150 will receive the FLTS signals from each one of BTS 1 110, BTS 2 120, and BTS 3 130. The reception and subsequent determination of DTOA (1, 2) and DTOA (2, 3) are therefore made more likely.

The repetition period P may be chosen so that the time period W required to transmit a FLTS signal is small by comparison. When P is so chosen, the duty cycle W/P is also small, and therefore the average transmitted power is not substantially greater than $X_0$ dBW. Therefore in one embodiment the ability of MS 1 150 to successfully determine the necessary DTOA values is increased without substantially increasing the average transmitted power.

Figure 5:
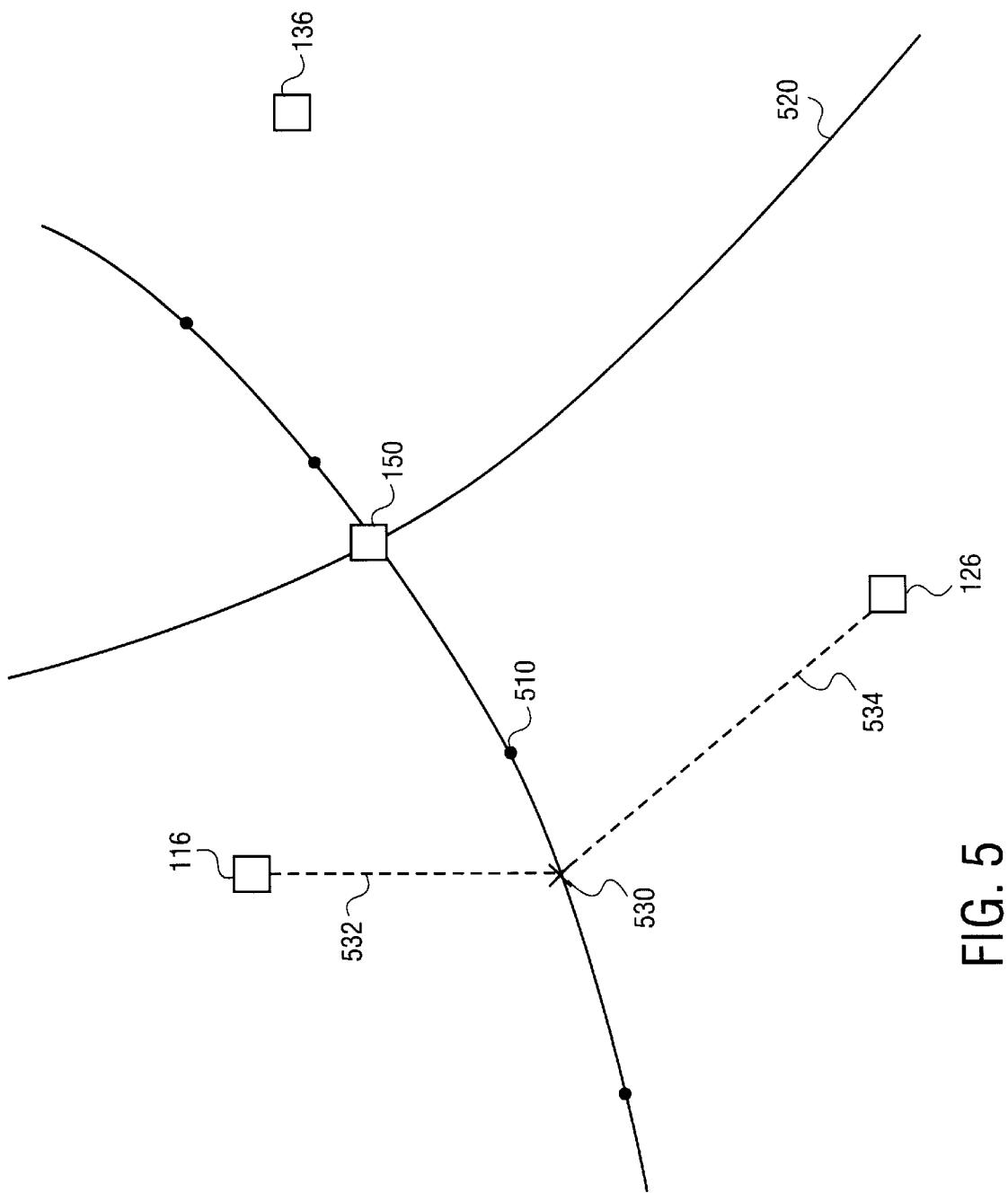
FIG. 5 illustrates the geographical hyperbolas of constant differential time of arrival, according to one embodiment of the present invention.

Referring now to FIG. 5, the geographical hyperbolas of constant differential time of arrival are illustrated, according to one embodiment of the present invention. In the discussions of FIGS. 3 and 4 above, it was shown how the use of synchronized transmission of FLTS signals allows BS 1 150 to determine the DTOA (1, 2) and DTOA (2, 3). However, knowing the DTOA of several signals does not immediately give the geographic location of MS 1 150.

The difference between the distance from MS 1 150 to BTS 1 110 and the distance from MS 1 150 to BTS 2 120 is equal to the speed of light times DTOA (1, 2). Therefore, knowing a DTOA, the difference in distance from MS 1 150 to a pair of BTSs may be calculated.

Knowing the geometric locations of antennas 116, 126, and 136, it is possible to derive the location of all points such that the distance from each point to one of the antennas is equal to the distance from that point to another antenna plus a constant amount. By a definition of elementary geometry such a location defines a hyperbola.

For example, consider point 530. Point 530 is located such that the distance from point 530 to antenna 126 (534) is equal to the distance from point 530 to antenna 116 (532) plus an amount equal to the speed of light times DTOA (1, 2). The location of all such points defines a hyperbola 510.

In other words, all possible points where a mobile station could potentially determine a DTOA of DTOA (1, 2) is hyperbola 510. Notice that MS 1 150 is located upon this hyperbola 510.

By similar reasoning, all possible points where a mobile station could potentially determine a DTOA of DTOA (2, 3) is hyperbola 520. By determining the geographic location where hyperbola 510 intersects hyperbola 520, the geographic location of MS 1 150 is determined.

Given the measured geographic locations of the antennas 116, 126, and 136, and the DTOA (1, 2) and DTOA (2, 3), it is well known in the computational art how to calculate the geographic locations of hyperbolas 510 and 520. Similarly it is well known in the computational art how to find the geographic location of the intersection of hyperbolas 510 and 520.

To summarize, the geographic locations of the antennas of the BTSs may be determined in advance by surveying or by using a GPS receiver. Knowing these geographic locations and determining the DTOA times of the FLTS, the geographic location of an MS may be calculated.

In one embodiment the calculation of the hyperbolas and their intersection point may be carried out by processors within MS 1 150. MS 1 150 may then transmit its geographic location to MSC 100 for forwarding to PSAP 108 when the need arises, such as when a E911 call is initiated. In alternate embodiments, the DTOA data may be forwarded from MS 1 150 to BSC 104 or MSC 100. In these embodiments processors within BSC 104 or MSC 100 may perform the calculation of the hyperbolas and their intersection point.

Figure 6:
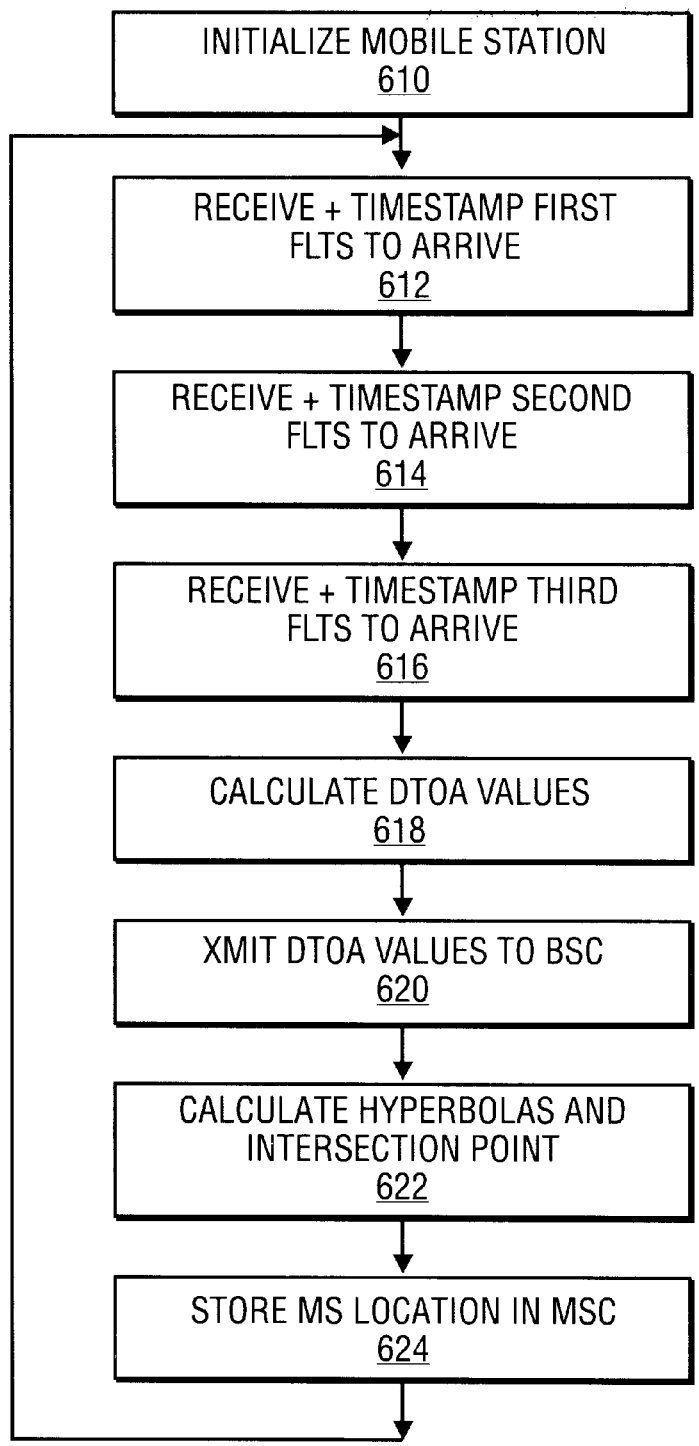
FIG. 6 illustrates a flowchart of the determination of the mobile station's geographic location, according to an embodiment of the present invention.

Referring now to FIG. 6, a flowchart of the determination of the mobile station's geographic location is shown, according to one embodiment of the present invention. In step 610 the mobile station is initialized within the CDMA mobile telephone system by receiving data from pilot channels 310 and sync channels 320. Then in step 612 the mobile station receives the first in a series of FLTS signals from one of at least three BTSs. The mobile station notes which BTS sent the FLTS and the time of arrival, and time stamps the message. In steps 614 and 616 the mobile station similarly receives, notes the transmitting BTS and time of arrival, and timestamps the messages. Then in step 616 the mobile station determines the values of the DTOA between the three FLTS signals.

In step 620, the mobile station transmits a message to the base station controller containing the DTOA information determined in step 616. Then in step 622 the base station controller uses the DTOA information and previously stored geographic location data for the antennas of the base transceiver stations to calculate the location hyperbolas and the point where the hyperbolas intersect. This geographic location is the location of the mobile station at that point in time. The geographic location is then, in step 624, sent to temporary storage within the mobile switching center for use when required. After the current value of the geographic location of the mobile station is stored, the process repeats and, starting over at step 612, the mobile station determines subsequent values of DTOA.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method for determining the geographic location of a mobile station in a mobile telephone system, comprising:

receiving a plurality of forward link triangulation signals at said mobile station, wherein said plurality of forward link triangulation signals are received with increased transmitted power occurs during a duty cycle;

timestamping said forward link triangulation signals within said mobile station;

calculating a first hyperbola and a second hyperbola from said timestamped forward link triangulation signals; and calculating the intersection of said first hyperbola and said second hyperbola.

2. The method of claim 1, wherein said receiving is continuously or periodically.

3. The method of claim 1, wherein said increased transmitted power includes adjusting said duty cycle such that average transmitted power is limited to a predetermined level.

4. The method of claim 1, wherein said timestamping includes calculating differential time of arrival values.

5. The method of claim 4, wherein said calculating said first hyperbola and said second hyperbola utilizes said differential time of arrival values.

6. The method of claim 1, further comprising broadcasting said plurality of forward link triangulation signals from a plurality of base transceiver stations.

7. The method of claim 6, wherein said increased transmitted power is provided at the plurality of base transceiver stations.

8. The method of claim 6, wherein said broadcasting is synchronized by a time standard.

9. The method of claim 8, wherein said time standard is set by a global positioning system.

10. A system for determining the geographic location of a mobile station in a mobile telephone system, comprising:

a plurality of forward link triangulation signals received at said mobile station, wherein said forward link triangulation signals are received with increased transmitted power during a duty cycle;

a receiver configured to couple a plurality of timestamped values to said forward link triangulation signals within said mobile station;

a first processor configured to calculate a first hyperbola and a second hyperbola from said timestamped values coupled to said forward link triangulation signals; and a second processor configured to calculate an intersection point of said first hyperbola and said second hyperbola.

11. The system of claim 10, wherein said forward link triangulation signals are received continuously or periodically.

12. The system of claim 10, wherein said duty cycle is adjustable such that average transmitted power is limited to a predetermined level.

13. The system of claim 10, wherein said forward link triangulation signals are broadcast from a plurality of base transceiver stations.

14. The system of claim 13, wherein said increased transmitted power is provided at the plurality of base transceiver stations.

15. The system of claim 10, wherein said receiver couples differential time of arrival values to said forward link triangulation signals.

16. The system of claim 15, wherein said first processor utilizes said differential time of arrival values.

17. The system of claim 10, wherein said base transceiver stations are synchronized by a time standard.

18. The system of claim 17, wherein said time standard is set by a global positioning system.

19. A machine-readable medium having stored thereon executable code which causes a machine to perform a method, for determining the geographic location of a mobile station in a mobile telephone system, the method comprising:

receiving a plurality of forward link triangulation signals at said mobile station, wherein said plurality of forward link triangulation signals are received with increased transmitted power occurs during a duty cycle;

timestamping said forward link triangulation signals within said mobile station;

calculating a first hyperbola and a second hyperbola from said timestamped forward link triangulation signals; and calculating the intersection of said first hyperbola and said second hyperbola.

20. The machine-readable medium of claim 19, wherein the method further comprises adjusting said duty cycle such that average transmitted power is limited to a predetermined level.

21. The machine-readable medium of claim 19, wherein said timestamping includes calculating differential time of arrival values.

22. The machine-readable medium of claim 19, wherein said calculating said first hyperbola and said second hyperbola utilizes said differential time of arrival values.

23. The machine-readable medium of claim 19, wherein said increased transmitted power is provided from a plurality of base transceiver stations.

* * * * *